US009125112B2

(12) United States Patent
Gao et al.

(10) Patent No.: US 9,125,112 B2
(45) Date of Patent: Sep. 1, 2015

(54) COMMUNICATING RADIO RESOURCE CONFIGURATION INFORMATION (71) Applicant: BLACKBERRY LIMITED, Waterloo (CA)

(72) Inventors: Shiwei Gao, Nepean (CA); Yufei Wu Blankenship, Kildeer, IL (US); Zhijun Cai, Euless, TX (US); Yi Song, Plano, TX (US)

(73) Assignee: Blackberry Limited, Waterloo, Ontario (CA)

( * ) Notice: Subject to any disclaimer, the term of this patent is extended or adjusted under 35 U.S.C. 154(b) by 0 days.

(21) Appl. No.: 13/960,187

(22) Filed: Aug. 6, 2013

(65) Prior Publication Data

US 2015/0045038 A1    Feb. 12, 2015

(51) Int. Cl.
*H04W 36/00* (2009.01)
*H04W 36/22* (2009.01)
*H04W 84/04* (2009.01)

(52) U.S. Cl.
CPC ...... *H04W 36/0072* (2013.01); *H04W 36/0027* (2013.01); *H04W 36/22* (2013.01); *H04W 84/045* (2013.01)

(58) Field of Classification Search
USPC ............ 455/426.1, 438, 552.1; 370/230, 237, 370/328, 335
See application file for complete search history.

(56) References Cited

U.S. PATENT DOCUMENTS

| | | | |
|---|---|---|---|
| 2008/0267146 A1 | 10/2008 | Lewis | |
| 2010/0182950 A1 | 7/2010 | Sexton | |
| 2011/0269466 A1 | 11/2011 | McGilly | |
| 2012/0002564 A1 | 1/2012 | Sexton | |
| 2013/0286826 A1* | 10/2013 | Park et al. | ............ 370/230 |

OTHER PUBLICATIONS

3GPP TS 33.401 V8.4.0, Technical Specification, 3rd Generation Partnership Project; Technical Specification Group Services and System Aspects; 3GPP System Architecture Evolution (SAE): Security architecture; (Release 8), Jun. 2009 (95 pages).
3GPP TR 33.821 V8.0.0, Technical Report, 3rd Generation Partnership Project; Technical Specification Group Services and System Aspects; Rationale and track of security decisions in Long Term Evolved (LTE) RAN / 3GPP System Architecture Evolution (SAE) (Release 8), Mar. 2009 (137 pages).
3GPP TS 36.300 V11.6.0, Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), Jun. 2013 (209 pages).
3GPP TS 36.331 V11.4.0, Technical Specification, 3rd Generation Partnership Project; Technical Specification Group Radio Access Network; Evolved Universal Terrestrial Radio Access (E-UTRA); Radio Resource Control (RRC); Protocol specification (Release 11), Jun. 2013 (346 pages).

(Continued)

*Primary Examiner* — Sam Bhattacharya
(74) *Attorney, Agent, or Firm* — Trop Pruner & Hu, P.C.

(57) ABSTRACT

A first wireless access network node receives common radio resource configuration information of a second wireless access network node. A data offload request is sent to the second wireless access network node to perform a data offload for a user equipment (UE) attached to the first wireless access network node.

24 Claims, 4 Drawing Sheets (56) References Cited

OTHER PUBLICATIONS

3GPP TS 36.413 V11.1.0, Technical Specification, 3rd Generation Partnership Project; Technical Specification Group Radio Access Network; Evolved Universal Terrestrial Radio Access Network (E-UTRAN); S1 Application Protocol (S1AP) (Release 11), Sep. 2012 (262 pages).
3GPP TS 36.423 V11.4.0 Technical Specification 3rd Generation Partnership Project; Technical Specification Group Radio Access Network; Evolved Universal Terrestrial Radio Access Network (E-UTRAN); X2 application protocol (X2AP) (Release 11) (Mar. 2013) (144 pages).
3GPP TR 36.806 V9.0.0, Technical Report, 3rd Generation Partnership Project; Technical Specification Group Radio Access Network; Evolved Universal Terrestrial Radio Access (E-UTRA); Relay architectures for E-UTRA (LTE-Advanced) (Release 9), Mar. 2010 (34 pages).
3GPP TR 36.839 V11.1.0, Technical Report, 3rd Generation Partnership Project; Technical Specification Group Radio Access Network; Evolved Universal Terrestrial Radio Access (E-UTRA); Mobility enhancements in heterogeneous networks (Release 11), Dec. 2012 (53 pages).
3GPP TR 36.912 V11.0.0, Technical Report, 3rd Generation Partnership Project; Technical Specification Group Radio Access Network; Feasibility study for Further Advancements for E-UTRA (LTE-Advanced) (Release 11), Sep. 2012 (62 pages).
Han et al., Capacity Analysis of Generalized Distributed Wireless Communication System and Transmit Antenna Selection for Maximization of Average Capacity, IEEE 2004 (5 pages), 2004.
Shan-Yuan Ho, Data Fusion in a Relay Network, SIT 2008, Toronto, Canada, Jul. 6-11, 2008 (5 pages).
Vasken Genc et al., IEEE 802.16J Relay-Based Wireless Access Networks: An Overview, Oct. 2008 (8 pages).
Kerpez et al., IEEE Transactions on Vehicular Technology, vol. 45, No. 2, 265—A Radio Access System with Distributed Antennas, May 1996 (11 pages).
David Soldani et al., Radio Communications Series, Nokia Siemens Networks, Wireless Relays for Broadband Access, Mar. 2008 (9 pages).
[Draft] 3GPP TR 36.392 V0.1.0 Technical Report 3rd Generation Partnership Project; Technical Specification Group Radio Access Network; Scenarios and Requirements for Small Cell Enhancement for E-UTRA and E-UTRAN; (Release 12) (Oct. 2012) (12 pages).
Shiwei Gao et al., U.S. Appl. No. 13/745,051 entitled Communicating Data Using a Local Wireless Access Network Node filed Jan. 18, 2013 (19 pages).
Yufei Wu Blankenship et al., U.S. Appl. No. 13/789,931 entitled Sending Data Rate Information to a Wireless Access Network Node filed Mar. 8, 2013 (42 pages).
Yufei Wu Blankenship et al. U.S. Appl. No. 13/837,819 entitled Establishing Multiple Connections Between a User Equipment and Wireless Access Network Nodes filed Mar. 15, 2013 (55 pages).
Yajun Zhu et al., U.S. Appl. No. 14/002,371 entitled Transmitting a Synchronization Indication filed Aug. 30, 2013 (47 pages).
Shiwei Gao et al., U.S. Appl. No. 13/886,627 entitled Controlling Data Offload in Response to Feedback Information filed May 3, 2013 (45 pages).
Yufei Wu Blankenship, U.S. Appl. No. 13/957,620 entitled Uplink Power Sharing Control filed Aug. 2, 2013 (41 pages).
3GPP TS 36.306 V11.3.0 Technical Specification 3rd Generation Partnership Project; Technical Specification Group Radio Access Network; Evolved Universal Terrestrial Radio Access (E-UTRA); User Equipment (UE) radio access capabilities (Release 11) (Mar. 2013) (27 pages).
3GPP TR 36.932 V12.1.0 Technical Report 3rd Generation Partnership Project; Technical Specification Group Radio Access Network; Scenarios and requirements for small cell enhancements for E-UTRA and E-UTRAN (Release 12) (Mar. 2013) (14 pages).
3GPP TSG-RAN Meeting#57, RP-121236 Chicago, USA, Source: NTT DOCOMO, Inc. Title: New Study Item Description: Small Cell Enhancements for E-UTRA and E-UTRAN—Higher-layer Aspects Document for: Approval Agenda Item: 13.2 3GPP™ Work Item Description Sep. 4-7, 2012 (5 pages).
3GPP TSG RAN#57, RP-121418 Chicago, USA, Source: CMCC Title: New Study Item Proposal: Scenarios and Requirements of LTE Small Cell Enhancements Agenda item: 13.2 Document for: Approval 3GPP™ Work Item Description, Sep. 4-7, 2012 (5 pages).
European Patent Office, Extended European Search Report for EP14179891.8 dated Jan. 19, 2015 (8 pages).
3GPP TSG-RAN2 Meeting #81, R2-130572, St. Julian's, Malta, Jan. 28-Feb. 1, 2013, Agenda Item: 7.2, Source: Intel Corporation, Title: Discussion on minimizing UE context transfer and signalling to CN, Document for: Discussion and Decision (6 pages).
3GPP TSG-RAN WG2 #82, R2-131672, Fukuoka, Japan, May 20-24, 2013, Agenda Item: 7.2.2.2, Source: Ericsson, ST-Ericsson, Title: Impact of small cell enhancements to RRC functions, Document for: Discussion, Decision (6 pages).
3GPP TSG RAN WG2 Meeting #81bis, R2-130990, Chicago, USA, Apr. 15-19, 2013, Source: Broadcom Corporation, Title: Mobility for dual connectivity, Agenda item: 7.2, Document for: Discussion and Decision (8 pages).
3GPP TSG RAN WG2 Meeting #84, R2-134103, San Francisco, CA, Nov. 11-15, 2013, Title: Discussions on System Information Exchange between MeNB and SeNB for data offload, Source: Blackberry UK Limited, Agenda Item: 7.2.3, Document for: Discussion (4 pages).

\* cited by examiner

COMMUNICATING RADIO RESOURCE CONFIGURATION INFORMATION

BACKGROUND

As the demand for wireless data communication using wireless user equipments (UEs) has increased, wireless access service providers are increasingly facing challenges in meeting capacity demands in regions where the density of users is relatively high. To address capacity issues, small cells have been developed. A small cell (or multiple small cells) can operate within a coverage area of a larger cell, referred to as a macro cell. A small cell has a coverage area that is smaller than the coverage area of the macro cell.

If small cells are deployed, then data communications with UEs can be offloaded from the macro cell to the small cells. In this way, data communication capacity is increased to better meet data communication demands in regions of relatively high densities of UEs.

BRIEF DESCRIPTION OF THE DRAWINGS

Some embodiments are described with respect to the following figures.

DETAILED DESCRIPTION

Figure 1:
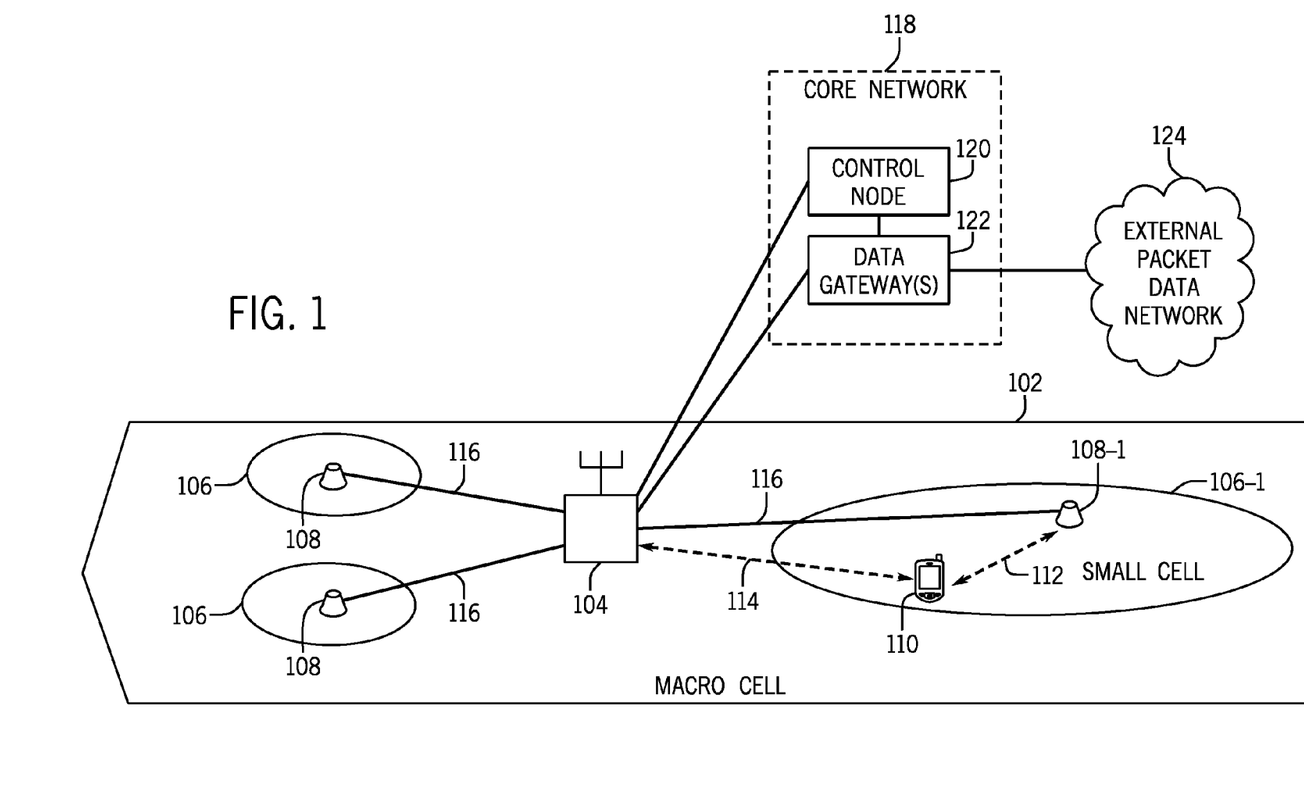
FIG. 1 is a schematic diagram of an example arrangement that includes macro cells and small cells, in accordance with some implementations.

FIG. 1 illustrates an example arrangement that includes network nodes that are part of a mobile communications network that supports wireless communications with user equipments (UEs). A node can refer to an active electronic device that is capable of sending, receiving, and forwarding information over a communication channel, and of performing designated tasks. A macro cell 102 corresponds to a coverage area provided by a macro wireless access network node 104. A coverage area can refer to a region where mobile services can be provided by a network node to a target level. A wireless access network node is responsible for performing wireless transmissions and receptions with UEs. In addition, a number of small cells 106 are depicted as being within the coverage area of the macro cell 102. Each small cell 106 corresponds to a coverage area provided by a respective small cell wireless access network node 108. One of the small cells is labeled 106-1, and the corresponding small cell wireless access network node is labeled 108-1.

In the ensuing discussion, a small cell can refer to a cell whose coverage area is smaller than the coverage area provided by a larger cell, which is also referred to as a macro cell. In some examples, the frequency at which the macro wireless access network node 104 operates can be lower than that of a local wireless access network node 108. A lower frequency allows a greater geographic reach for wireless signals transmitted by the macro wireless access network node 104. On the other hand, at a higher frequency, wireless signals transmitted by the small cell wireless access nodes 108 propagate smaller distances. As a result, small cells 106 can be deployed in relatively close proximity to each other.

More generally, the macro cell 102 can use a frequency that is different from one or more frequencies of the small cells 106. At least some of the small cells 106 can use different frequencies.

A wireless user equipment (UE) 110 within the coverage area of the small cell 106-1 is able to wirelessly communicate with the small cell wireless access network node 108-1. The UE 110 is also able to wirelessly communicate with the macro wireless access network node 104. Examples of the UE 110 can include any of the following: a smart phone, a personal digital assistant, a notebook computer, a tablet computer, or any other device that is capable of wireless communications. Although just one UE 110 is depicted in FIG. 1, it is noted that multiple UEs may be present in coverage areas of each of the small cells 106 as well as within the coverage area of the macro cell 102.

Although reference is made to macro and small cell wireless access network nodes in the present discussion, it is noted that techniques or mechanisms according to some implementations can also be applied to other types of wireless access network nodes.

A first wireless connection 112 is established between the UE 110 and the small cell wireless access network node 108-1. In addition, a second wireless connection 114 can be established between the UE 110 and the macro wireless access network node 104. In such an arrangement, the UE 110 is considered to have established dual concurrent wireless connections with the macro wireless access network node 104 and the small cell wireless access network node 108-1. In other examples, the UE 110 can establish multiple concurrent wireless connections with the macro wireless access network node 104 and with multiple small cell wireless access network nodes 108.

FIG. 1 also shows a backhaul link 116 between the macro wireless access network node 104 and each of the small cell wireless access network nodes 108. The backhaul link 116 can represent a logical communication link between two nodes; the backhaul link 116 can either be a direct point-to-point link or can be routed through another communication network or node. In some implementations, the backhaul link 116 is a wired link. In other implementations, the backhaul link 116 is a wireless link.

In some implementations, the macro cell 102 (and more specifically the macro wireless access network node 104) can provide all of the control plane functions, while a small cell 106 (more specifically the corresponding small cell wireless access network node 108) provides at least a portion of the user plane functions for a dual-connection capable UE (a UE that is capable of concurrently connecting to both macro and small cells). Note that the macro wireless access network node 104 can also provide user plane functions for the dual-connection capable UE.

Control plane functions involve exchanging certain control signaling between the macro wireless access network node 104 and the UE 110 to perform specified control tasks, such as any or some combination of the following: network attachment of a UE, authentication of the UE, setting up radio bearers for the UE, mobility management to manage mobility of the UE (mobility management includes at least determining which infrastructure network nodes will create, maintain or drop uplink and downlink connections carrying control or user plane information as a UE moves about in a geographic area), performance of a handover decision based on neighbor cell measurements sent by the UE, transmission of a paging message to the UE, broadcasting of system information, control of UE measurement reporting, and so forth. Although examples of control tasks and control messages in a control plane are listed above, it is noted that in other examples, other types of control messages and control tasks can be provided. More generally, the control plane can perform call control and connection control functions, and can provide messaging for setting up calls or connections, supervising calls or connections, and releasing calls or connections.

User plane functions relate to communicating traffic data (e.g. voice data, user data, application data, etc.) between the UE and a wireless access network node. User plane functions can also include exchanging control messages between a wireless access network node and a UE associated with communicating the traffic data, flow control, error recovery, and so forth.

A small cell connection can be added to or removed from a UE under the control of the macro wireless access network node 104. In some implementations, the action of adding or removing a small cell for a UE can be transparent to a core network 118 of the mobile communications network. The core network 118 includes a control node 120 and one or more data gateways 122. The data gateway(s) 122 can be coupled to an external packet data network (PDN) 124, such as the Internet, a local area network (LAN), a wide area network (WAN), and so forth. FIG. 1 depicts the macro wireless network node 104 connected to the control node 120 and data gateway(s) 122 of the core network 118. Although not shown, it is noted that the small cell wireless access network nodes 108 can also be connected to the core network nodes.

Note that a legacy UE (a UE that is not capable of establishing dual wireless connections with both a macro cell and a small cell) can connect to either a macro cell or a small cell using standard wireless connection techniques.

When a UE moves under the coverage of a small cell 106, the macro wireless access network node 104 may decide to offload some of the user plane traffic to the small cell. This offload is referred to as data offload. When data offload has been performed from the macro cell 104 to the small cell 106, then a UE that has a dual connection can transmit or receive data to and from the corresponding small cell wireless access network node 108. Additionally, the UE 110 can also communicate user plane traffic with the macro wireless access network node 104. Although reference is made to data offload to one small cell, it is noted that in other examples, the macro cell 104 can perform data offload for the UE 110 to multiple small cells.

In some examples, the data offload causes the offloaded data to be communicated between the macro wireless access network node 104 and the respective small cell wireless access network node 108 over the respective backhaul link 116. In this case, the data offload involves the macro cell 102, without involving the core network 118. In other words, the data offload is transparent to the core network 118.

In other examples, the data offload may be performed at the data gateway 122, such as a serving gateway (discussed further below). In this case, the serving gateway can send some of the UE's user plane traffic directly to the small cell wireless access network node 108 over a link between the small cell wireless access network node 108 and the data gateway 122, such as the S1-U link according to the Long-Term Evolution (LTE) standards. In this case, the data offload is visible to the core network 118.

As another example, the data gateway 122 can send data to the small cell wireless access network node 108 via the macro wireless access network node 104. In this case, the macro wireless access network node 104 acts as a router for forwarding data communicated between the data gateway 122 and the small cell wireless access network node 108.

The data offload procedure (for offloading data of a UE from the macro wireless access network node 104 to a small cell wireless access network node 108) can be similar to traditional handover procedures, in which a UE is handed over from a source wireless access network node to a target wireless access network node. In a traditional handover procedure, certain system information is transferred between the source wireless access network node and the target wireless access network node. The amount of system information that can be exchanged between the source and target wireless access network nodes can be quite large. If such exchange of system information between wireless access network nodes is also applied to a data offload procedure, then that would result in exchanges of large amounts of system information for each data offload. Because small cells have relatively small coverage areas, the number of occurrences of data offloads performed by the macro wireless access network node to small cell wireless access network nodes can be relatively high as a UE moves around. Also, a large number of UEs in the coverage area of the macro cell 102 can also lead to increased occurrences of data offload.

In accordance with some implementations, to reduce the amount of system information that is exchanged between a macro cell and a small cell for a data offload, certain system information can be communicated between the macro cell wireless access network node and a small cell wireless access network node prior to performing the data offload.

Techniques or mechanisms according to some implementations can be applied in contexts other than the context of a data offload from a macro eNB to a small cell eNB. For example, techniques or mechanisms to reduce system information communication can be applied for device-to-device (D2D) communications, relay communications, and so forth. D2D communication refers to direct wireless communication of data between UEs, where the data does not pass through an eNB. Relay communication refers to wireless communication of data via a relay node that forwards data between an eNB and a UE. More generally, data offload can refer to any communication data that is provided between an intermediate wireless access network node and a UE, where the intermediate wireless access network node is distinct from an eNB. In the small cell context, the intermediate wireless access network node is a small cell eNB. In the D2D context, the intermediate wireless access network node can be a UE. In the relay context, the intermediate wireless access network node can be a relay node.

In the ensuing discussion, reference is made to mobile communications networks that operate according to the Long-Term Evolution (E-UTRA) standards as provided by the Third Generation Partnership Project (3GPP). The E-UTRA standards are also referred to as the Evolved Universal Terrestrial Radio Access (E-UTRA) standards.

Although reference is made to E-UTRA in the ensuing discussion, it is noted that techniques or mechanisms according to some implementations can be applied to other wireless access technologies.

In an E-UTRA network, a wireless access network node can be implemented as an enhanced Node B (eNB), which includes functionalities of a base station and base station controller. Thus, in an E-UTRA network, a macro wireless access network node is referred to as a macro eNB. In an E-UTRA network, small cell wireless access network nodes can be referred to as small cell eNBs.

In an E-UTRA network, the control node 120 in the core network 118 can be implemented as a mobility management entity (MME). An MME is a control node for performing various control tasks associated with an E-UTRA network. For example, the MME can perform idle mode UE tracking and paging, bearer activation and deactivation, selection of a serving gateway (discussed further below) when the UE initially attaches to the E-UTRA network, handover of the UE between macro eNBs, authentication of a user, generation and allocation of a temporary identity to a UE, and so forth. In other examples, the MME can perform other or alternative tasks.

In an E-UTRA network, the data gateway(s) 122 of the core network 118 can include a serving gateway (SGW) and a packet data network gateway (PDN-GW). The SGW routes and forwards traffic data packets of a UE served by the SGW. The SGW can also act as a mobility anchor for the user plane during handover procedures. The SGW provides connectivity between the UE and the PDN 124. The PDN-GW is the entry and egress point for data communicated between a UE in the E-UTRA network and a network element coupled to the PDN 124. Note that there can be multiple PDNs and corresponding PDN-GWs. Moreover, there can be multiple MMEs and SGWs.

Pre-Exchanging System Information Between a Macro Cell and a Small Cell

As noted above, to reduce the amount of information exchanged between the macro cell 102 and a small cell 106 for a data offload, certain system information can be exchanged between the macro and small cell eNBs before the data offload is performed. The system information that can be communicated between the macro and small cell eNBs (104 and 108, respectively, in FIG. 1) can include common radio resource configuration information. The common radio resource configuration information can be part of system information exchanged between the macro and small cell eNBs 104 and 108. Common radio resource configuration information, or more generally, common system information, refers to radio resource configuration information (or system information) that is applicable to all UEs served by a given eNB. Radio resource configuration information specifies the configuration(s) of various radio resources used for establishing, maintaining, or otherwise controlling a wireless connection between a UE and an eNB.

Figure 2:
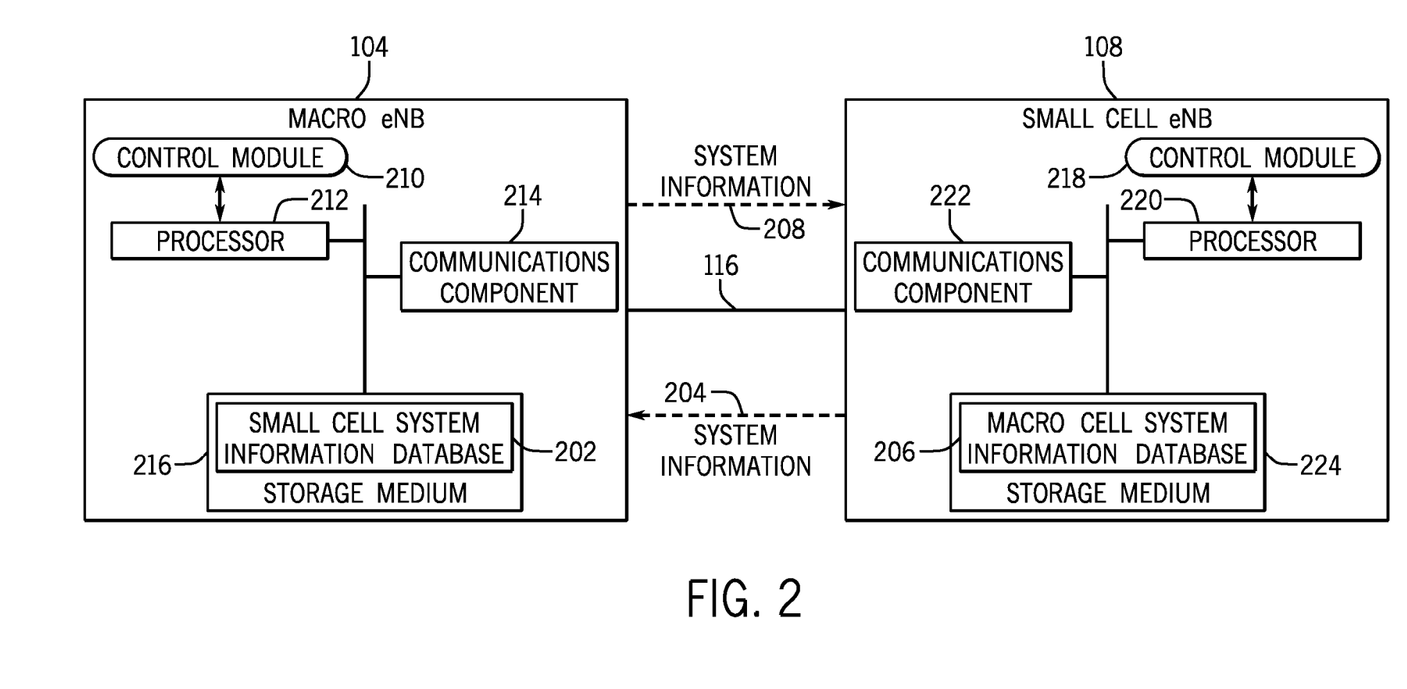
FIG. 2 is a schematic diagram of a macro wireless access network node and a small cell wireless access network node, according to some implementations.

FIG. 2 illustrates an example in which a macro eNB 104 exchanges system information with a small cell eNB 108. The macro eNB 104 includes a database 202 that contains system information of small cells. The database 202 contains system information transmitted (204) by the small cell eNB 108, as well as other small cell eNBs. A "database" refers to a data structure, or multiple data structures, which can store data.

The small cell eNB 108 includes a database 206 that stores system information of the macro eNB 104. The system information contained in the database 206 was transmitted (208) by the macro eNB 104.

In some examples, the system information exchanged between the macro eNB 104 and the small cell eNB 108 can include system information contained in the following: master information block (MIB), system information block type 1 (SIB1), system information type 2 (SIB2), and optionally system information of other SIB types, such as SIB type 3 (SIB3) to SIB type 5 (SIB5). In other examples, the system information exchanged between the macro eNB 104 and the small cell eNB 108 can include system information in other combinations of SIBs. In further examples, the system information can be other types of system information.

An SIB is broadcast by an eNB within its coverage area. The MIB includes a number of the most essential and most frequently transmitted parameters that are used to acquire other information from the cell, and is transmitted on a broadcast channel (BCH). SIBs other than SIB1 are carried in System Information (SI) messages. SIB1 contains scheduling information pertaining to the other SIBs. A UE first reads the information elements of the MIB to allow the UE to read the information elements of the other SIBs.

The various different types of SIBs can include information that can be used by a UE to determine whether the UE is allowed to access a cell, information relating to cells, radio resource configuration information, power control information, timers, parameters for cell selection and reselection, parameters for configuration of common physical channels, and so forth. More generally, an SIB refers to any message or information element that contains information relating to the mobile communications network or one or more cells, where the information is useable by a UE to establish a connection to a cell of the mobile communications network.

The small cell system information database 202 contains system information of small cells under the coverage of the macro cell 102. Similarly, the macro cell system information database 206 contains system information of the macro cell 104 in which the small cell eNB 108 is overlaid. If there is any change in system information, an update is performed to update the appropriate one or both of the small cell system information database 202 and the macro cell system information database 206. System information exchange can be performed periodically or on-demand. For example, for on-demand exchange, the macro eNB 104 can request certain small cell eNBs to provide selected system information, such as MIB or SIB1. After receiving the request, a small eNB can provide the requested information over the backhaul link (e.g. 116), which can be the X2 interface. In alternative examples, the system information exchange can also be performed periodically; the periodicity can be set to a larger value so that the signaling relating to the system information exchange does not overload the backhaul link. In some implementations, only the macro eNB 104 has the system information of the small cells, while small cell eNBs do not have the system information of the macro cell. In alternative examples, the small cell eNBs may form clusters, and only cluster heads may have the system information of the macro cell.

Note that system information is one type of common radio resource configuration information. While in FIG. 2 system information is used as an example to illustrate the information exchange between the macro eNB and the small cell eNB, other types of common radio resource configuration can be exchanged as well. For example, a common radio resource configuration for the downlink can be sent from one eNB to another eNB, including a Physical Downlink Shared Channel (PDSCH) common configuration and antenna information. As another example, a common radio resource configuration for the downlink can be sent from one eNB to another eNB, including any one or more of a Physical Uplink Control Channel (PUCCH) common configuration, a Physical Uplink Shared Channel (PUSCH) common configuration, or an uplink sounding reference signal common configuration. In general, one or more types of the common radio resource configuration can be sent from one eNB to another eNB; moreover, such configuration information exchange can be uni-directional or bi-directional.

FIG. 2 also depicts other components of the macro eNB 104 and the small cell eNB 108. The macro eNB 104 includes a control module 210, which can be implemented as machine-readable instructions executable on one or more processors 212 to perform various tasks as described in this disclosure. A processor can include a microprocessor, microcontroller, processor module or subsystem, programmable integrated circuit, programmable gate array, or another control or computing device.

The processor(s) 212 can be coupled to a communications component 214 and one or more storage media 216. The small cell system information database 202 is stored in the one or more storage media 216. The communications component 214 allows the macro eNB 104 to communicate over the backhaul link 116 with the small cell eNB 108.

The small cell eNB 108 includes a control module 218, which can be implemented as machine-readable instructions executable on one or more processors 220 to perform various tasks described in this disclosure. The processor(s) 220 can be coupled to a communications component 222 and one or more storage media 224. The small cell system information database 206 is stored in the one or more storage media 224. The communications component 220 allows the small cell eNB 108 to communicate over the backhaul link 116 with the macro eNB 104.

Although not shown, each of the macro eNB 104 and small cell eNB 108 can include a wireless communications component to communicate wirelessly with UEs.

In some examples, the system information sent from the small cell eNB 108 to the macro eNB 104, or vice versa, can be carried in a new message or a new information element of an existing message over the backhaul link 116. A new message or a new information element refers to a message or information element that is not provided by current standards, but which may (or may not) be defined by future standards. On the other hand, an existing message or an existing information element refers to a message or information element provided by current standards.

In some examples, system information between eNBs may be carried in a new inter-eNB information element (IE), referred to as AS-Config-Common. The AS-Config-Common IE can be exchanged between the macro eNB 104 and small cell eNB 108 prior to a data offload procedure being performed. The content of an example AS-Config-Common IE is provided below:

```
-- ASN1START
AS-Config-Common ::=        SEQUENCE {
    sourcePhysCellId        PhysCellId,
    SourceCellConfigList    ::=SEQUENCE (SIZE(1.. maxServCell)) OF
SourceCellConfig
    SourceCellConfig        ::=SEQUENCE {
        sourceMasterInformationBlock    MasterInformationBlock,
        sourceSystemInformationBlock-   SystemInformationBlockType1
        Type1                           (WITH COMPONENTS
                                        {..., nonCriticalExtension
                                        ABSENT}),
        sourceSystemInformationBlock-   SystemInformationBlockType2,
        Type2
        sourceSystemInformationBlock-   SystemInformationBlockType3,
        Type3                           OPTIONAL
        sourceSystemInformationBlock-   SystemInformationBlockType4,
        Type4                           OPTIONAL
        sourceSystemInformationBlock-   SystemInformationBlockType5,
        Type5                           OPTIONAL
        antennaInfoCommon               AntennaInfoCommon,
        sourceDl-CarrierFreq            ARFCN-ValueEUTRA,
    ...,
    }
}
-- ASN1STOP
```

The system information contained in the foregoing AS-Config-Common IE includes the system information of the MIB, SIB1, SIB2, SIB3, SIB4, and SIB5. Note that in the example above, SIB3, SIB4, and SIB5 are optional elements.

An example of the database 202 (containing small cell system information) kept by the macro eNB 104 is provided below:

| Radio configuration | | Small cell x | Small cell y | Small cell z | ... |
|---|---|---|---|---|---|
| Physical cell ID (PCI) | | | | | |
| Antenna ports | | | | | |
| Carrier frequency (or ARFCN) | | | | | |
| MIB | DL bandwidth | | | | |
| | PHICH configuration | | | | |
| | ... | | | | |
| SIB1 | Cell identity | | | | |
| | Maximum UL transmit power | | | | |
| | TDD configuration | | | | |
| | ... | | | | |
| SIB2 | Common radio resource configuration | | | | |
| | UL frequency | | | | |
| | UL bandwidth | | | | |
| | ... | | | | |
| ... | | | | | |

The table above includes various rows that contain information relating to the MIB, SIB1, SIB2, and so forth. The database 202 contains various columns corresponding to different small cells (small cell x, small cell y, and so forth). In a different example, the table may be condensed and only contain selected radio configuration information.

The small cell system information that can be stored in the database 202 can be configured using one of a number of different techniques.

In a first technique, the system information of a small cell is configured by the macro eNB 104. The macro eNB 104 determines the system information of each associated small cell (associated with macro eNB 104), stores the system information in the database 202, and sends the system information to each small cell eNB 108 (such as by use of the AS-Config-Common IE discussed above). The macro eNB 104 is responsible for the initial configuration of the system information in the associated small cells, as well as responsible for system information updates at the small cells.

Using a second technique, the system information of the small cell is configured by a second macro eNB that is different from the macro eNB 104 that is associated with the small cell. This may happen, for example, if the small cell is located at a cell edge between two macro cells. In this case, the system information of the small cell is determined and configured by the second macro eNB, and sent from the second macro eNB to the small cell, such as by use of the AS-config-Common IE discussed above. After the small cell has received the system information from the second macro eNB, the small cell eNB can send the system information (such as by use of the AS-Config-Common IE) to the macro eNB 104.

System information updates for the small cell can also flow from the second macro eNB to the small cell, and then the updated system information can be sent by the small cell eNB to the macro eNB 104. It is also possible that after the second macro eNB determines and configures the system information of the small cell, the second macro eNB can directly forward the small cell's system information to the macro eNB 104.

With a third technique, a small cell eNB can configure its own system information. In this case, the system information of the small cell and updates of the system information can be sent from the small cell eNB to the macro eNB 104. If the small cell is at the boundary of two macro cells, the small cell eNB can send its system information to both respective macro eNBs. In another example, the macro eNB 104 may determine a subset of the system information configuration for the small cell eNBs, but the small cell eNBs may configure its remaining system information configuration.

System information of a small cell that is common to all UEs served by the small cell is referred to as common system information, or more specifically, common radio resource configuration information. The common system information can be exchanged and updated separately from a data offload procedure. The pre-exchanged common system information does not have to be exchanged again over the backhaul link 116 between the macro and small cell eNBs during a setup of the data offload. For example, during a data offload setup, the small cell eNB 108 does not have to send the small cell common radio configuration information to the macro eNB 104, since the macro eNB 104 already has the information stored in the database 202.

To set up the data offload, the macro eNB 104 can send the common system information of the small cell in a message sent to a UE that is the subject of the data offload. For example, the message can be a Radio Resource Control (RRC) message. An RRC message is used for establishing an RRC connection (a radio connection). RRC is described further in 3GPP TS 36.331, in some examples.

Note that the small cell's neighbor cell information contained in SIB4 and SIB5 may be used by the macro eNB 104 to determine the small cells to be measured by a UE. The macro eNB 104 can notify the UE to measure such small cells, which allows the UE to avoid or reduce the number of instances of performing small cell discovery, which can save power consumption at the UE.

The database 206 (containing macro cell system information) stored at a small cell eNB 108 can have a similar format as the database 202 at the macro eNB 104. An example of such database 206 is provided below:

| Radio configuration | | Macro cell x | Macro cell y | Macro cell z | ... |
|---|---|---|---|---|---|
| Physical cell ID (PCI) | | | | | |
| Antenna ports | | | | | |
| Carrier frequency (or ARFCN) | | | | | |
| MIB | DL bandwidth | | | | |
| | PHICH configuration | | | | |
| | ... | | | | |
| SIB1 | Cell identity | | | | |
| | Maximum UL transmit power | | | | |
| | TDD configuration | | | | |
| | ... | | | | |
| SIB2 | Common radio resource configuration | | | | |
| | UL frequency | | | | |
| | UL bandwidth | | | | |
| | ... | | | | |
| ... | | | | | |

The content of the database 206 is similar to the content of the database 202, except various columns of the database 206 contain information regarding different macro cells (macro cell x, macro cell y, and so forth). Note that if a small cell is able to observe just one macro cell, then the database 206 would contain just one column for that macro cell.

In alternative implementations, the database 206 is not provided at the small cell eNB 108. In other words, in such implementations, the macro eNB 104 can store the database 202 containing small cell system information, but the small cell eNBs 108 do not store the database 206 containing macro cell system information.

Examples of common radio resource configuration information that can be stored in the databases 202 and 206 can include the following. Note that the radio resource configuration information can include configuration information for various layers at the eNB, including a physical layer, medium access control (MAC) layer, radio link control (RLC) layer, and a Packet Data Convergence Protocol (PDCP) layer.

The physical layer is the lowest layer in the corresponding node (UE or eNB). The physical layer can include networking hardware for transmitting signals over a wireless link. The MAC layer provides addressing and channel access control mechanisms. The RLC layer can provide at least some of the following example functionalities, as described in 3GPP TS 36.322, including: transfer of upper layer PDUs; error correction, such as by using Automatic Repeat reQuest (ARQ); concatenation, segmentation, and reassembly of RLC SDUs; reordering of RLC data PDUs; and so forth. The PDCP layer can provide at least some of the following functionalities in the user plane, as described in 3GPP TS 36.323, including: header compression and decompression; in-sequence delivery of upper layer packet data units (PDUs); duplicate detection of lower layer service data units (SDUs); retransmission of PDCP SDUs; and so forth.

The following provides examples of the common radio resource configuration information for the physical layer. Similar configuration information can be provided for the higher layers.

The common radio resource configuration information can include any one or some combination of the following, as examples: downlink carrier frequency, bandwidth, number of antennas at an eNB, Physical Hybrid-ARQ Indicator Channel (PHICH) configuration (relating to the PHICH for carrying acknowledgments of traffic data), selected Physical Random Access Channel (PRACH) configuration common to all served UEs (relating to the PRACH for random access procedures performed by a UE), selected sounding reference signal (SRS) configuration common to all served UEs (relating to an SRS transmitted by a UE), selected Physical Downlink Shared Channel (PDSCH) configuration common to all served UEs (relating to the PDSCH for carrying downlink traffic data), selected Physical Uplink Control Channel (PUCCH) configuration common to all served UEs (relating to the PUCCH for carrying uplink control signaling), selected Physical Uplink Shared Channel (PUSCH) configuration common to all served UEs (relating to the PUSCH for carrying uplink traffic data), and selected uplink power control configuration common to all served UEs (relating to uplink power control at a UE), and so forth.

In addition to common radio resource configuration information, system information can also include dedicated radio resource configuration information, which is specific to a given UE. Examples of the dedicated radio resource configuration information include any one or some combination of the following: antenna configuration, selected PRACH configuration specific to the given UE, selected PDSCH configuration specific to the given UE, selected PUCCH configuration specific to the given UE, selected PUSCH configuration specific to the given UE, selected SRS configuration specific to the given UE, selected uplink power control specific to the given UE, a configuration relating to reporting of a channel quality indicator (CQI), a Scheduling Request (SR) configuration that relates to the SR sent to initiate an uplink data transfer, and so forth.

Data Offload Procedure

Figure 3:
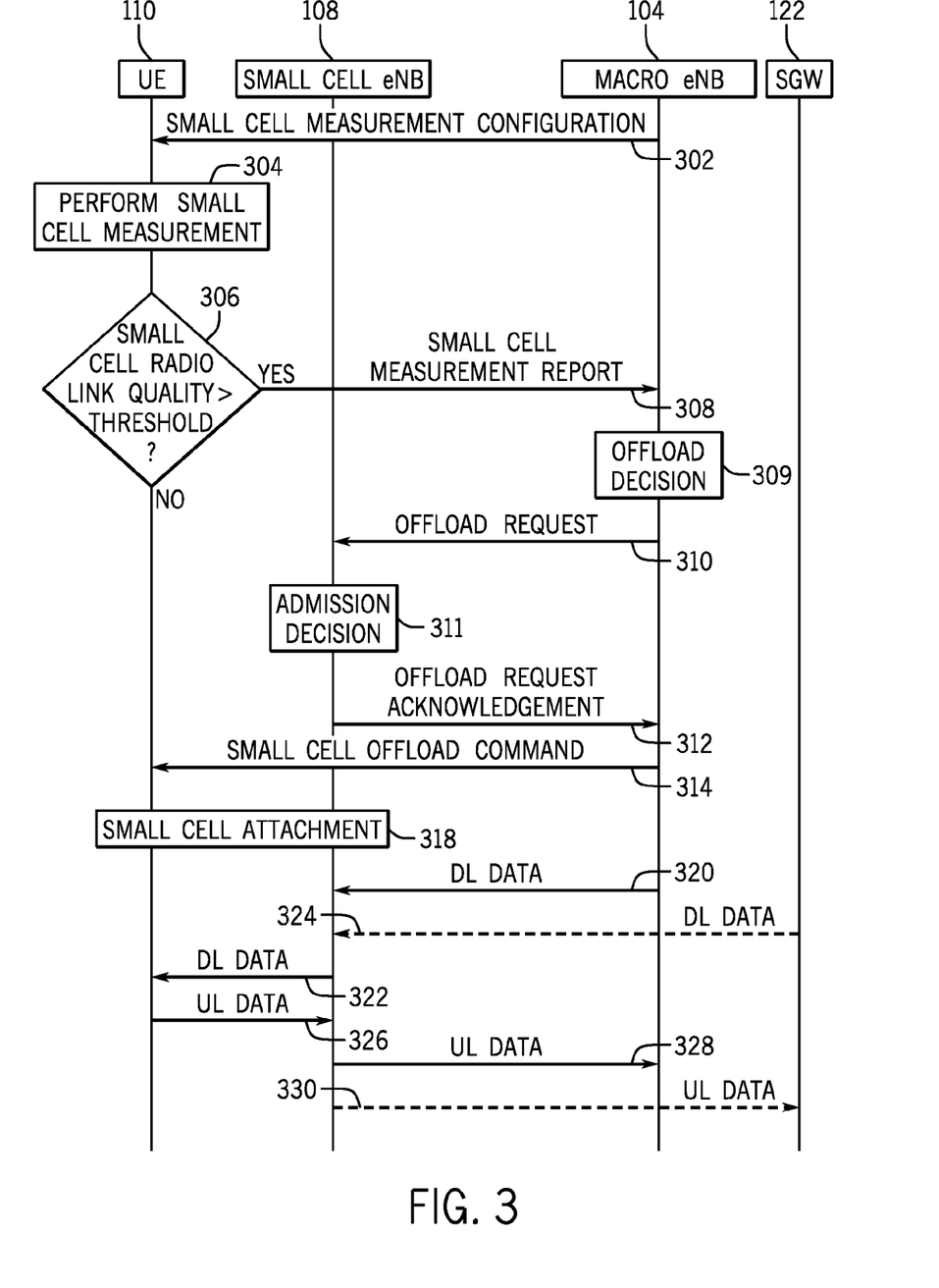
FIG. 3 is a flow diagram of a data offload procedure according to some implementations.

FIG. 3 is a flow diagram of an example data offload procedure. As depicted in FIG. 3, the macro eNB 104 sends (at 302) a small cell measurement configuration message to the UE 110. The small cell measurement configuration message configures the UE 110 to perform measurement of radio links to one or more small cells, at the carrier frequency (or frequencies) of the respective small cell(s). In response to the small cell measurement configuration message, the UE 110 performs (at 304) a small cell measurement. If the UE detects (at 306) that a small cell radio link quality is greater than a specified threshold, then the UE 110 sends (at 308) a small cell measurement report that contains measurement data to the macro eNB 104. The small cell measurement report can include an indication of a strength of a radio link with a given small cell (or with multiple small cells), and can identify the small cell (or small cells).

Based on the small cell measurement report from the UE 110, the macro eNB 104 can determine that the UE 110 is within the coverage area of a small cell, and thus, can make a decision (at 309) to initiate a data offload of at least a portion of traffic data to the small cell. Offloading at least a portion of the traffic data can include offloading traffic data associated with certain radio access bearers. A radio access bearer can refer to an E-UTRAN (Evolved Universal Terrestrial Radio Access Network) Radio Access Bearer (E-RAB), which is used to transport data between a UE and a core network node, such as the SGW 122. A data radio bearer (DRB) is used to transport the data of the E-RAB between a UE and an eNB. Reference to offloading a radio access bearer can refer to either offloading a given E-RAB or the corresponding DRB.

The macro eNB 104 sends (at 310) an Offload Request message to the small cell eNB 108 that is part of the small cell to which data offload is to be performed. The Offload Request message can be sent over the backhaul link 116 between the macro eNB 104 and the small cell eNB 108. The Offload Request message can include certain information, including information identifying the radio access bearer(s) to be offloaded, UE profile information (to identify the UE that is the subject of the data offload), quality-of-service (QoS) profile information (to describe the QoS associated with communications with a UE 110), and other information.

The Offload Request message can also indicate whether the data offload is to include downlink data only, uplink data only, or both downlink and uplink data. The Offload Request message may also include flow control parameters such as threshold values for the flow control functions between the macro cell and the small cells.

In response to the Offload Request message, the small cell eNB 108 can make an admission decision (at 311) to accept the requested data offload. The small cell eNB 108 then sends (at 312) a data offload response to the Offload Request message. This offload response is referred to as an Offload Request Acknowledgment message to the macro eNB 104. The Offload Request Acknowledgment message can also be sent over the backhaul link 116. The Offload Request Acknowledgment message can indicate whether the small cell eNB 108 has accepted or denied the Offload Request.

In situations where the Offload Request Acknowledgment message indicates that the small cell eNB 108 has accepted the Offload Request, the Offload Request Acknowledgment message can further identify the radio access bearer(s) that is (are) accepted by the small cell eNB 108. Note that the small cell eNB 108 can accept just a subset of the radio access bearers identified in the Offload Request message from the macro eNB 104. Alternatively, the small cell eNB 108 can accept all of the radio access bearers identified in the Offload Request message.

Note that the small cell eNB 108 can indicate in the Offload Request Acknowledgment whether the data offload is for downlink data only, uplink data only, or both downlink and uplink data, based on the Offload Request and the available resources of the small cell eNB 108.

Note also that the macro eNB 108, depending upon what has been accepted by the small cell eNB 108, can find one or more other small cells to fulfill the data offload. Alternatively, the macro eNB 104 can decide to partition the data offload to multiple small cells. For example, downlink data offload can be provided to a first small cell, uplink data offload can be provided to a second small cell, and so forth.

In situations where the Offload Request Acknowledgment indicates that the Offload Request has been denied, the Offload Acknowledgment can identify a cause of the denial.

In some examples, the Offload Request Acknowledgment can also include random access information, including a dedicated preamble. The random access information, including the dedicated preamble, can be used by the UE to perform a random access procedure with the small cell eNB 108 to establish a radio connection with the small cell eNB 108. A dedicated preamble can be used by the UE 110, and not by other UEs, to perform the random access procedure to establish the radio connection with the small cell eNB 108.

Tasks 310, 311, and 312 are part of a data offload preparation (or setup) phase of the data offload procedure.

The remaining tasks in FIG. 3 after task 312 are part of the execution phase of the data offload procedure. If the Offload Request Acknowledgment message indicates that the Offload Request has been accepted, the macro eNB 104 can send (at 314) a Small Cell Offload command (e.g. in an RRC message) to the UE 110, to instruct the UE 110 to start the establishment of a second radio connection with the small cell identified in the Small Cell Offload command. The Small Cell Offload command can include information about the small cell that is to be used by the UE 110 to establish the second radio connection with the small cell.

For example, the information can include the random access information that was included in the Offload Request Acknowledgment message from the small cell eNB 108 to the macro eNB 104. Also, the information in the Small Cell Offload command can include both common and dedicated radio resource configuration information, as discussed above.

The Small Cell Offload Command can also specify multiple small cells for the data offload. Additionally, the Small Cell Offload Command can specify that the data offload is downlink data only, uplink data only, or both downlink and uplink data, so that the UE 110 can allocate resources accordingly.

In response to the Small Cell Offload command sent at 314, the UE 110 performs (at 318) an attachment procedure with the small cell eNB 108, for establishing a radio connection with the small cell eNB 108. In the small cell attachment procedure, the UE 110 can send a PRACH with the dedicated preamble that was included in the Small Cell Offload command.

After sending of the Offload Request Acknowledgment (at 312) indicating acceptance of the Offload Request, the small cell eNB 108 is ready to receive data from and transmit data to the macro eNB 104. After receipt of the Offload Request Acknowledgment (at 312) accepting the Offload Request, the macro eNB 104 can send (at 320) downlink data for the UE 110 to the small cell eNB 108 (assuming that downlink data is part of the data offload). The downlink data can be sent from the macro eNB 104 to the small cell eNB 108 over the backhaul 116. In response to the downlink data received at 320, the small cell eNB 108 can forward (at 322) the downlink data to the UE 110. In alternative implementations, downlink data for the UE 110 is sent (at 324) from the SGW 122 to the small cell eNB 108, either over the S1-U link or indirectly through the macro eNB 104.

The UE 110 can also send (at 326) uplink data to the small cell eNB 108 (assuming that uplink data is part of the data offload). The small cell eNB 108 in turn forwards (at 328) the uplink data to the macro eNB 104. In alternative implementations, the small cell eNB 108 can transfer the uplink data (at 330) directly to the SGW 122 or indirectly to the SGW 122 through the macro eNB 104.

As part of the Offload Request message sent at 310 in FIG. 3, the macro eNB 104 can transfer certain UE context to the small cell eNB 108. The UE context can include the following information:

UE radio capability, such as information identifying which radio access technology (e.g. E-UTRA, UTRA, etc.) the UE can use and/or information regarding UE category, physical layer and radio frequency parameters;

UE security capability and security context (which is provided in cases where a Packet Data Convergence Protocol (PDCP) layer is implemented in the small cell eNB 108); and dedicated radio resource configuration in the macro eNB 104, which can be reused in the small cell without modification.

In some examples, a modified version of a HandoverPreparationInformation message (traditionally used to set up a handover of a UE between eNBs) can be used to transfer the foregoing UE context. Note, however, that the common radio resource configuration information in the macro eNB 104 does not have to be transferred from the macro eNB 104 to the small cell eNB 108 as part of the data offload procedure, as would traditionally be included in the HandoverPreparationInformation message. A new DataOffloadPreparationInformation IE can be included in the HandoverPreparationInformation message (new elements are underlined), such as in the example below:

```
-- ASN1START
HandoverPreparationInformation ::=    SEQUENCE {
    criticalExtensions                CHOICE {
        c1                                CHOICE{
            handoverPreparationInformation-r8    HandoverPreparationInformation-r8-IEs
            dataOffloadPreparationInformation    DataOffloadPreparationInformation-IEs,
            spare6 NULL, spare5 NULL, spare4 NULL,
            spare3 NULL, spare2 NULL, spare1 NULL
        },
        criticalExtensionsFuture          SEQUENCE { }
    }
}
DataOffloadPreparationInformation-IEs::=SEQUENCE{
    ue-RadioAccessCapabilityInfo  UE-CapabilityRAT-ContainerList,
    as-Config                     AS-Config-dedicated     OPTIONAL,
    rrm-Config                    RRM-Config              OPTIONAL,
}
HandoverPreparationInformation-r8-IEs ::= SEQUENCE {
    ue-RadioAccessCapabilityInfo  UE-CapabilityRAT-ContainerList,
    as-Config                     AS-Config               OPTIONAL,    -- Cond HO
    rrm-Config                    RRM-Config              OPTIONAL,
    as-Context                    AS-Context              OPTIONAL,    -- Cond HO
    nonCriticalExtension          HandoverPreparationInformation-v920-IEs         OPTIONAL
}
HandoverPreparationInformation-v920-IEs ::= SEQUENCE {
    ue-ConfigRelease-r9           ENUMERATED {
                                      rel9, rel10, rel11, spare5, spare4, spare3,
                                      spare2, spare1, ...}       OPTIONAL,  -- Cond HO2
    nonCriticalExtension          HandoverPreparationInformation-v9d0-IEs         OPTIONAL
}
HandoverPreparationInformation-v9d0-IEs ::= SEQUENCE {
    lateNonCriticalExtension      OCTET STRING
        OPTIONAL,
    nonCriticalExtension          HandoverPreparationInformation-v9e0-IEs
        OPTIONAL
}
HandoverPreparationInformation-v9e0-IEs ::= SEQUENCE {
    as-Config-v9e0                AS-Config-v9e0          OPTIONAL,  -- Cond HO2
    nonCriticalExtension          HandoverPreparationInformation-v1130-IEs
        OPTIONAL
}
HandoverPreparationInformation-v1130-IEs::= SEQUENCE {
    as-Context-v1130              AS-Context-v1130        OPTIONAL,  -- Cond HO2
    nonCriticalExtension          SEQUENCE { }            OPTIONAL
}
-- ASN1STOP
```

Note that in the DataOffloadPreparationInformation IE, just the dedicated Access Stratum (AS) configuration is included. Note that the AS-Config-Dedicated IE is a new inter-eNB information element that provides just dedicated AS configuration information (which includes the dedicated radio resource configuration information discussed above) between the macro eNB and the small cell eNB. An example of such AS-Config-Dedicated IE is set forth below:

```
-- ASN1START
AS-Config-Dedicated ::=        SEQUENCE {
    sourceMeasConfig           MeasConfig,
    sourceRadioResourceConfig  RadioResourceConfigDedicated,
    sourceSecurityAlgorithm-   SecurityAlgorithmConfig,
    Config
    sourceUE-Identity          C-RNTI,
}
-- ASN1STOP
```

The AS-Config-Dedicated IE contains a measurement configuration, dedicated radio resource configuration, security algorithm configuration, and UE identity.

Note also that the DataOffloadPreparationInformation IE does not include the AS-Context IE, which is used to carry information for re-establishing an RRC connection in case of RRC connection failure. This is because in a data offload, the UE would maintain its RRC connection with the macro eNB 104, such that re-establishment of an RRC connection would not have to be performed.

The measurement configuration in the AS-Config-Dedicated IE provides a configuration of measurements existing in the source eNB when the data offload was triggered. The dedicated radio resource configuration information provides the radio resource configuration for radio bearers existing in the source macro cell when the data offload was performed. The source security algorithm configuration information provides the AS integrity protection and AS ciphering algorithm that is used in the source macro cell.

The Offload Request message and the Offload Request Acknowledgment message (310 and 312, respectively, in FIG. 3) each may include a new DataOffloadControlInfo IE. An example of this IE is provided below.

```
-- ASN1START
DataOffloadControlInfo::=      SEQUENCE {
    targetPhysCellId           PhysCellId,
    carrierFreq                CarrierFreqEUTRA
    carrierBandwidth           CarrierBandwidthEUTRA
    additionalSpectrumEmission     AdditionalSpectrumEmission
    offloadTimer               ENUMERATED{
                                   ms50, ms100, ms150, ms200,
                                   ms500, ms1000,ms2000, spare1},
    newUE-Identity             C-RNTI,
        radioResourceConfigCommon    RadioResourceConfigCommon,
    radioResourceConfigDedicated   RadioResourceConfigDedicated,
    offloadingdirectionConfig  OffloadingDirection,
    rach-ConfigDedicated       RACH-ConfigDedicated
    OPTIONAL, -- Need OP
    ...,
}
}
-- ASN1STOP
```

In the DataOffloadControlInfo IE, a RadioResourceConfigDedicated IE is included—this IE contains dedicated radio resource configuration information, but does not include common radio resource configuration information.

A new offloadTimer IE includes an offload timer that can be used to specify the time window for the UE to perform a random access procedure to the small cell after the data offload. A new offloadingdirectionConfig IE specifies the data offload direction, such as downlink only, uplink only or both uplink and downlink.

Information Sent by Macro Cell to UE

After receiving the Offload Request Acknowledgment message (at 312) from the small cell eNB 122, the macro eNB 104 may send an RRCConnectionReconfiguration message to the UE to ask the UE to setup radio connections to the small cell. The RRCConnectionReconfiguration message can provide the Small Cell Offload command sent at 314 in FIG. 3. In some examples, a new RRCConnectionReconfiguration-DataOffload IE can be included in the RRCConnectionReconfiguration message. The RRCConnectionReconfiguration-DataOffload IE can be used to carry the common radio resource configuration of the small cell that is stored in the database 202 at the macro eNB 104 (FIG. 2).

An example of the RRCConnectionReconfiguration-DataOffload IE is provided below.

```
-- ASN1START
RRCConnectionReconfiguration ::=   SEQUENCE {
    rrc-TransactionIdentifier      RRC-TransactionIdentifier,
    criticalExtensions             CHOICE {
        c1                         CHOICE{
            rrcConnectionReconfiguration-r8    RRCConnectionReconfiguration-r8-IEs,
            rrcConnectionReconfigurationDataOffloadRRCConnectionReconfigurationDataOffload,
            spare6 NULL, spare5 NULL, spare4 NULL,
            spare3 NULL, spare2 NULL, spare1 NULL
        },
        criticalExtensionsFuture   SEQUENCE { }
    }
}
RRCConnectionReconfiguration-r8-IEs ::= SEQUENCE {
    measConfig                 MeasConfig                 OPTIONAL, -- Need ON
    mobilityControlInfo        MobilityControlInfo        OPTIONAL, -- Cond HO
    radioResourceConfigDedicated   RadioResourceConfigDedicated   OPTIONAL, -- Cond HO-
    toEUTRA
    securityConfigHO           SecurityConfigHO           OPTIONAL, -- Cond HO
    nonCriticalExtension       RRCConnectionReconfiguration-v890-IEs   OPTIONAL --
```

```
Need OP
}
RRCConnectionReconfigurationDataOffload::=SEQUENCE{
    DataOffloadControlInfo        DataOffloadControlInfo
    radioResourceConfigCommon     RadioResourceConfigCommon
    measConfig                    MeasConfig                  OPTIONAL,  -- Need ON
    securityConfigHO              SecurityConfigHO            OPTIONAL   -- Need ON
}
    ...
}
-- ASN1STOP
```

The DataOffloadControlInfo IE is described further above. The radioResourceConfigCommon IE contains the common radio resource configuration information. The measConfig IE contains a measurement configuration that provides a configuration of measurements to be made by UE in the small cell eNB. The securityConfigHO IE provides the AS integrity protection and AS ciphering algorithm that is to be used by the UE in the small cell.

Unlike in the handover case where the handover command is transparent to the source eNB, here the RRCConnectionReconfiguration message is composed by the macro eNB 104 after receiving the response from the small cell eNB 108. This is because in the handover case, it is expected that the target eNB will take over control of the UE after handover is completed. In the data offload case, however, the RRC connection to the macro eNB 104 remains in place after the data offload. The UE maintains a single RRC connection to the macro eNB 104. The offloading direction allows the UE to know whether it should receive downlink offload data only, transmit uplink offload data only, or both, through the small cell eNB 108.

In this case, the UE does not have to monitor the small cell downlink for possible system information changes in the small cell. If there is a change of small cell system information, the small cell can send an update to the macro cell and the macro cell can send the new system information to the UE. In another example, the small cell may directly provide the updated system information to the UE via the dedicated signaling connection if a signaling connection between the UE and the small cell exists.

A UE may acquire the small cell system information directly from the small cell downlink after receiving a data offload command from the macro cell. In this case, it may take longer time for the UE to setup a connection to the small cell.

UE Procedure for Data Offload

If the RRCConnectionReconfiguration message received by a UE includes a DataOffloadControlInfo IE, and the UE is able to comply with the configuration included in this message, the UE can perform the following tasks. The underlined text refers to new tasks, while the remaining tasks are performed according to current standards.

(new) start a data offload timer with the timer value set to the offloadTimer IE, as included in the DataOffloadControlInfo IE;
if the carrierFreq IE is included:
    consider the target cell to be one on the frequency indicated by the carrierFreq IE with a physical cell identity indicated by the targetPhysCellId IE;
else:
    consider the target cell to be one on the frequency of the source primary cell with a physical cell identity indicated by the targetPhysCellId IE;
start synchronising to the downlink of the target cell;
(new) establish a new MAC connection associated with the target cell;
re-establish PDCP for all offloaded resource blocks (RBs) that are established;
re-establish RLC for all offloaded RBs that are established;
apply the value of the newUE-Identity IE as the Cell Radio Network Temporary Identifier (C-RNTI) in the target cell;
configure lower layers associated with the target cell in accordance with the received radioResourceConfigCommon IE;
configure lower layers associated with the target cell in accordance with any additional fields, not covered in the previous, if included in the received DataOffloadControl Info IE;
configure lower layers associated with the target cell in accordance with the received radioResourceConfiqDedicated IE;
if the RRCConnectionReconfiguration message includes the measConfig IE and the offloadinqdirectionConfiq IE:
    perform a measurement configuration procedure;
(new) send the RRCConnectionReconfigurationComplete message to the source eNB;
(Perform random access to the target cell)
if MAC successfully completes the random access procedure:
    stop data offload timer;
    apply the parts of the CQI reporting configuration, the SR configuration and the SRS configuration that do not involve the UE having to know the subframe number (SFN) of the target primary cell, if any;
    apply the parts of the measurement and the radio resource configurations for which the UE has to know the SFN of the target primary cell (e.g. measurement gaps, periodic CQI reporting, SR configuration, SRS configuration), if any, upon acquiring the SFN of the target primary cell;
    the procedure ends.

If the UE cannot apply any of the configurations, the UE may send a data offload failure message to the macro eNB 104.

The UE may also send a data offload failure message to the macro eNB 104 if the data offload timer expires before the random access procedure is completed.

System Architecture

Figure 4:
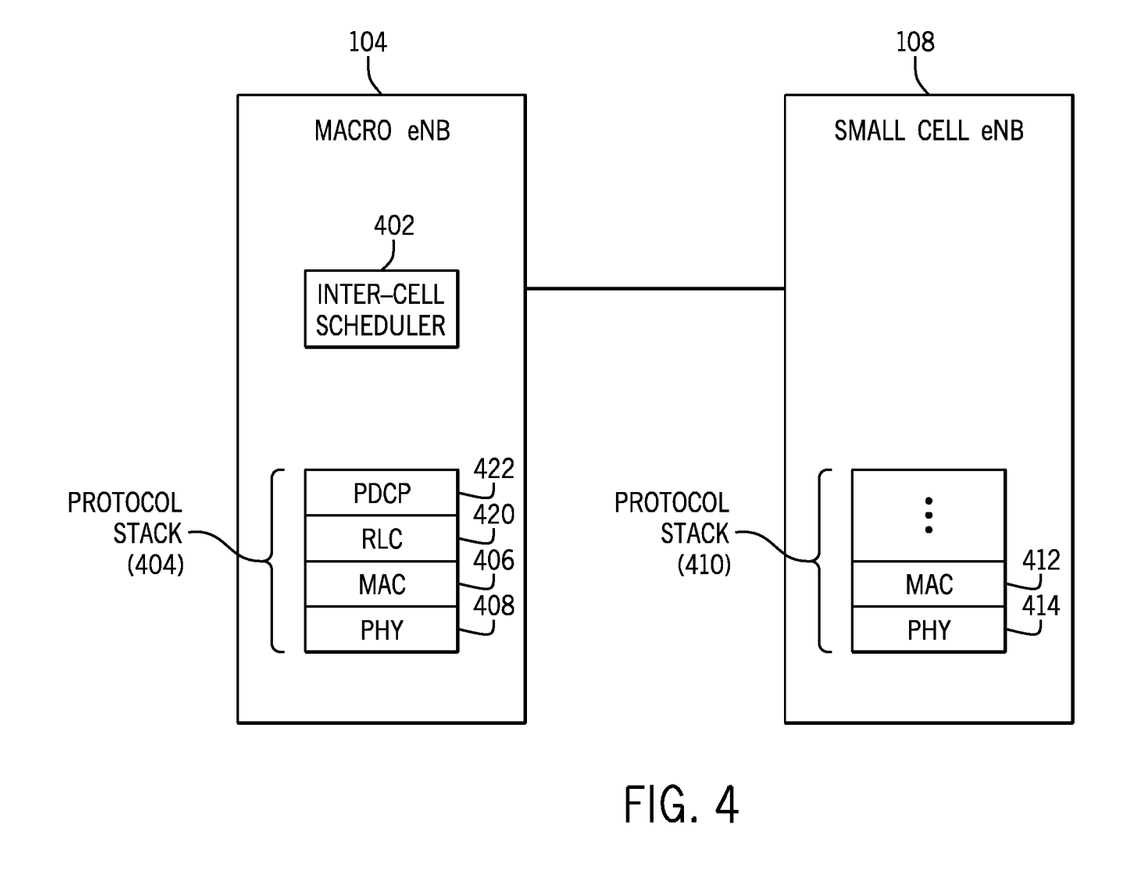
FIG. 4 is a schematic diagram of a macro wireless access network node and a small cell wireless access network node, according to further implementations.

FIG. 4 illustrates example protocol layers in the macro eNB 104 and the small cell eNB 108. The macro eNB 104 can include an inter-cell scheduler 402, which is responsible for radio access bearer setup for both the macro eNB 104 and small cell eNBs in the coverage area of the macro eNB 104.

The macro eNB 104 also includes a protocol stack 404, which includes layers that provide specified procedures for performing communications. In FIG. 4, a MAC layer 406 and physical layer 408 of the protocol stack 404 are depicted. The physical layer 408 can include networking hardware for transmitting signals over a wireless link. The MAC layer 406 provides addressing and channel access control mechanisms.

The small cell eNB 108 also includes a protocol stack 410, which includes a MAC layer 412 and a physical layer 414. The protocol stack 410 of the small cell eNB 108 is used in communications between the small cell eNB 108 and a UE (such as 110 in FIG. 1), while the protocol stack 404 of the macro eNB 104 is used in communications between the macro eNB 104 and the UE.

The protocol stacks 404 and 410 depicted in FIG. 4 are user plane protocol stacks. In addition to the MAC and physical layers shown in FIG. 4, there can be other protocol layers, including a PDCP layer and an RLC layer. As shown in FIG. 4, the protocol stack 404 in the macro eNB 104 includes an RLC layer 420 and a PDCP layer 422. The PDCP layer 422 is above the RLC layer 420, which is above the MAC layer 406. The protocol stack 410 of the small cell eNB 108 may or may not include the PDCP and RLC layers, depending on where a user plane split occurs.

Which protocol layers are included in the small cell eNB 108 depends on where a user plane protocol stack is split in the macro eNB 104. Splitting a user plane protocol stack at a given point results in multiple user plane paths, with one user plane path through the macro eNB and another user plane path through the small cell eNB. The splitting can be performed at one of several different points in the user plane protocol stack.

Various modules described above, including those depicted in FIGS. 2 and 4, can be implemented as machine-readable instructions, which can be stored in a computer-readable or machine-readable storage medium (or storage media). The storage medium or storage media can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   receiving, by a first wireless access network node, common radio resource configuration information of a second wireless access network node; and
   sending, by the first wireless access network node, a data offload request to the second wireless access network node to perform a data offload for a user equipment (UE) attached to the first wireless access network node.

2. The method of claim 1, wherein the common radio resource configuration information includes downlink configuration information of the second wireless access network node.

3. The method of claim 1, wherein the common radio resource configuration information includes uplink configuration information of the second wireless access network node.

4. The method of claim 1, wherein the common radio resource configuration information includes system information of the second wireless access network node.

5. The method of claim 1, further comprising:
   receiving, by the first wireless access network node from the second wireless access node, a data offload response containing dedicated radio resource configuration information for the UE; and
   sending, by the first wireless access node, a data offload command to the UE, the data offload command containing the common radio resource configuration information and the dedicated radio resource configuration information.

6. The method of claim 1, further comprising:
   storing, by the first wireless access network node, the received common radio resource configuration information.

7. The method of claim 1, further comprising:
   sending, by the first wireless access network node, common radio resource configuration information of the first wireless access network node to the second wireless access network node for storing at the second wireless access network node.

8. The method of claim 1, further comprising
   storing, by the first wireless access node, the common radio resource configuration information; and
   sending, by the first wireless access node, the stored common radio resource configuration information to a plurality of UEs.

9. The method of claim 1, further comprising:
   sending, by the first wireless access network node to the second wireless access network node, context information of the UE in association with the data offload request.

10. The method of claim 1, further comprising:
    receiving, by the first wireless access network node from the second wireless access network node, offload control information as part of a response to the data offload request, the offload control information including information for establishing a radio connection between the UE and the second wireless access network node.

11. The method of claim 10, wherein the offload control information includes a timer information element related to a time period over which the UE is allowed to initiate access to the second wireless access network node.

12. The method of claim 10, wherein the offload control information includes an indication of a direction of the data offload.

13. A first wireless access network node comprising:
a storage medium to store a data structure containing common radio resource configuration information of a second wireless access network node; and
at least one processor configured to:
receive, from the second wireless access network node, a data offload request specifying that the first wireless access network node is to perform a data offload for a user equipment (UE) attached to the second wireless access network node, wherein the data offload request identifies radio access bearers to be offloaded from the second wireless access network node to the first wireless access network node;
in response to the data offload request, perform the data offload by the first wireless access network node for the second wireless access network node; and
send, to the second wireless access network node, a response to the data offload request, the response including an indication of a direction of the data offload, wherein the direction is selected from an uplink direction only, a downlink direction only, or both the uplink and downlink directions.

14. The first wireless access network node of claim 13, wherein a radio connection between the second wireless access network node and the UE is maintained after the UE has set up a radio connection with the first wireless access network node to perform the data offload in which user plane traffic of the UE is communicated between the first wireless access network node and the UE.

15. The first wireless access network node of claim 13, wherein the response further includes dedicated radio resource configuration information of the UE in the first wireless access network node.

16. The first wireless access network node of claim 13, wherein the at least one processor is configured to further:
send common radio resource configuration information of the first wireless access network node to the second wireless access network node.

17. The first wireless access network node of claim 13, wherein the at least one processor is configured to further:
send, to the second wireless access network node, a timer information element related to a time period over which the UE is allowed to initiate access to the first wireless access network node.

18. A first wireless access network node comprising:
a storage medium to store a data structure containing common radio resource configuration information of a second wireless access network node; and
at least one processor configured to:
send a data offload request to the second wireless access network node to initiate a data offload for a user equipment (UE) attached to the first wireless access network node, the data offload request specifying offload of user plane traffic of the UE from the first wireless access network node to the second wireless access network node, and the data offload request identifying radio access bearers to be offloaded from the first wireless access network node to the second wireless access network node; and
receive, from the second wireless access network node, a response to the data offload request, the response including an indication of a direction of the data offload, wherein the direction is selected from an uplink direction only, a downlink direction only, or both the uplink and downlink directions.

19. The first wireless access network node of claim 18, wherein the response further includes dedicated radio resource configuration information for the UE, and wherein the at least one processor is configured to further:
send a data offload command to the UE, the data offload command containing the common radio resource configuration information and the dedicated radio resource configuration information.

20. The method of claim 1, wherein the data offload request specifies offload of user plane traffic of the UE from the first wireless access network node to the second wireless access network node.

21. The method of claim 20, wherein the first wireless access network node is a first enhanced Node B of a Long-Term Evolution (LTE) network, and the second wireless access network node is a second enhanced Node B of the LTE network.

22. The method of claim 1, wherein in response to the data offload the UE has radio connections with both the first and second wireless access network nodes.

23. The method of claim 1, wherein the received common radio resource configuration information comprises Long-Term Evolution (LTE) information selected from among a master information block (MIB) and a system information block (SIB).

24. The method of claim 1, wherein the data offload request identifies radio access bearers to be offloaded from the first wireless access network node to the second wireless access network node.

* * * * *